May 17, 1949.  E. MITTELMANN  2,470,443
MEANS FOR AND METHOD OF CONTINUOUSLY MATCHING
AND CONTROLLING POWER FOR HIGH-FREQUENCY
HEATING OF REACTIVE LOADS
Filed July 21, 1944  3 Sheets-Sheet 1

INVENTOR.
Eugene Mittelmann
By Maurice S. Cayne
atty.

May 17, 1949.                       E. MITTELMANN                           2,470,443
          MEANS FOR AND METHOD OF CONTINUOUSLY MATCHING
                AND CONTROLLING POWER FOR HIGH-FREQUENCY
                       HEATING OF REACTIVE LOADS
Filed July 21, 1944                                              3 Sheets-Sheet 2
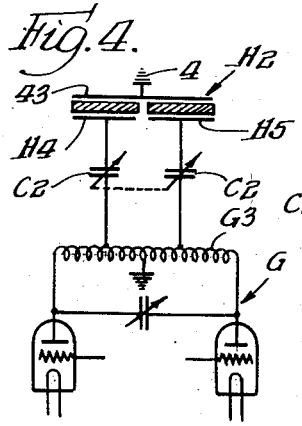
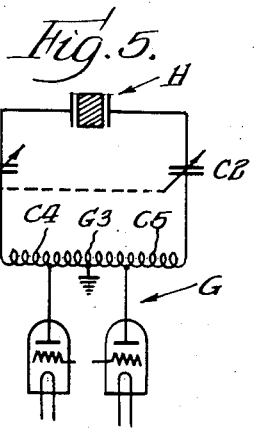
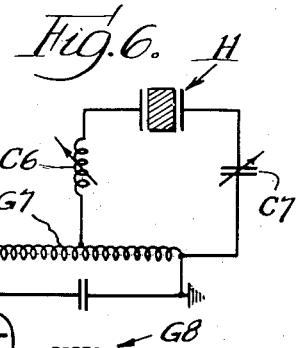
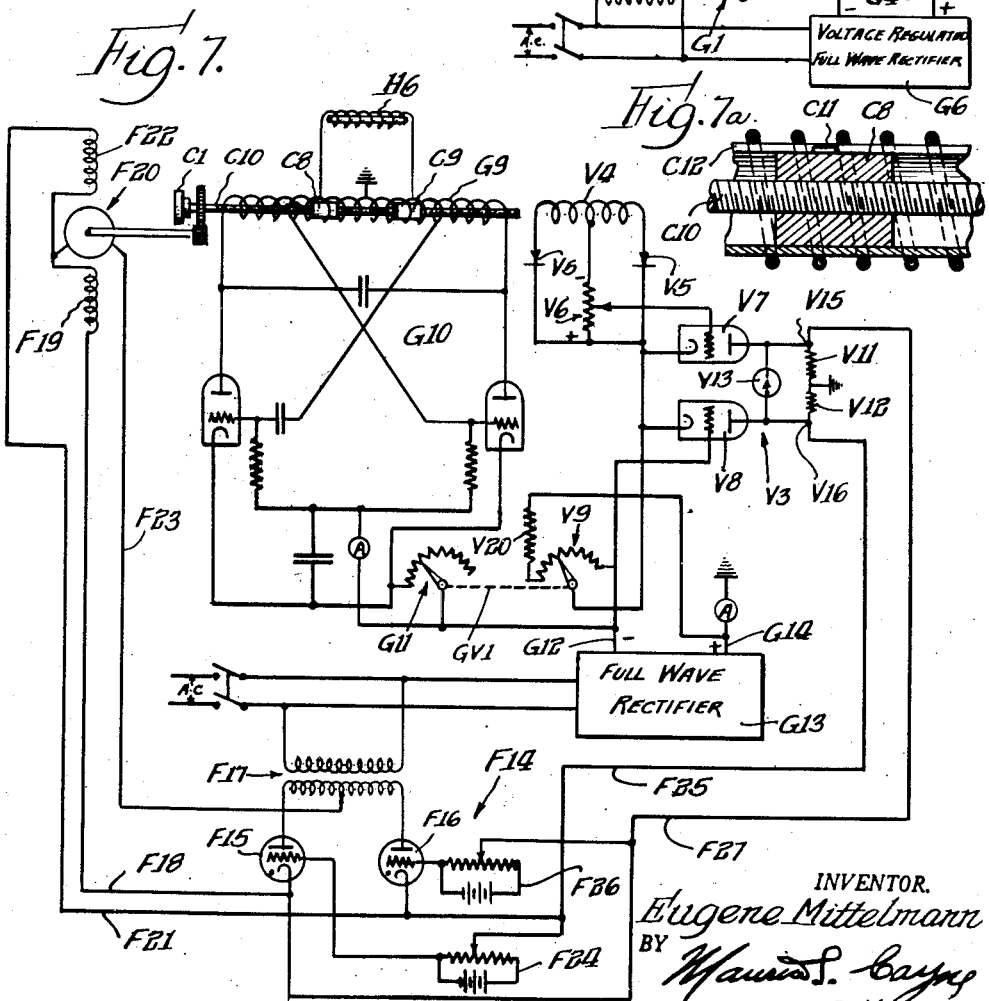
INVENTOR.
Eugene Mittelmann
BY
Atty.

May 17, 1949.
E. MITTELMANN
2,470,443
MEANS FOR AND METHOD OF CONTINUOUSLY MATCHING AND CONTROLLING POWER FOR HIGH-FREQUENCY HEATING OF REACTIVE LOADS
Filed July 21, 1944
3 Sheets-Sheet 3
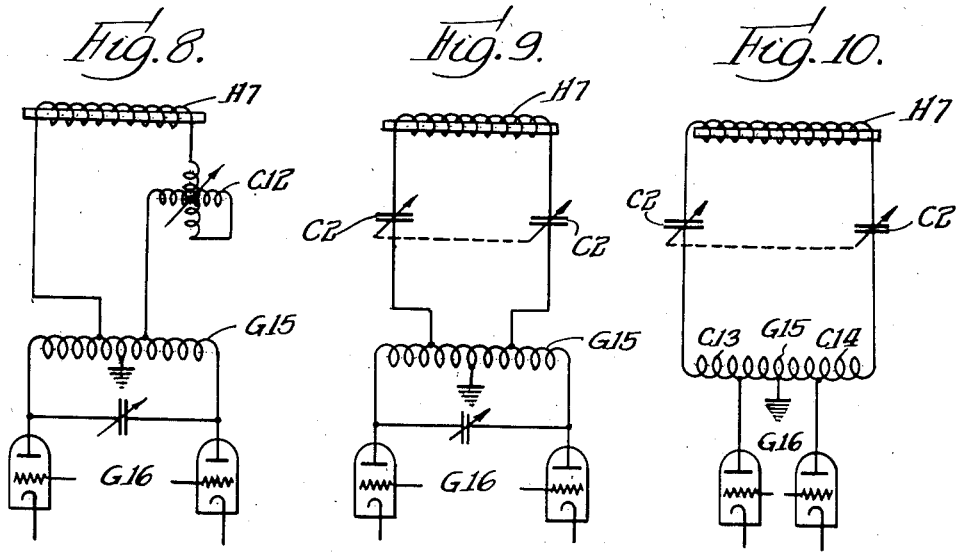
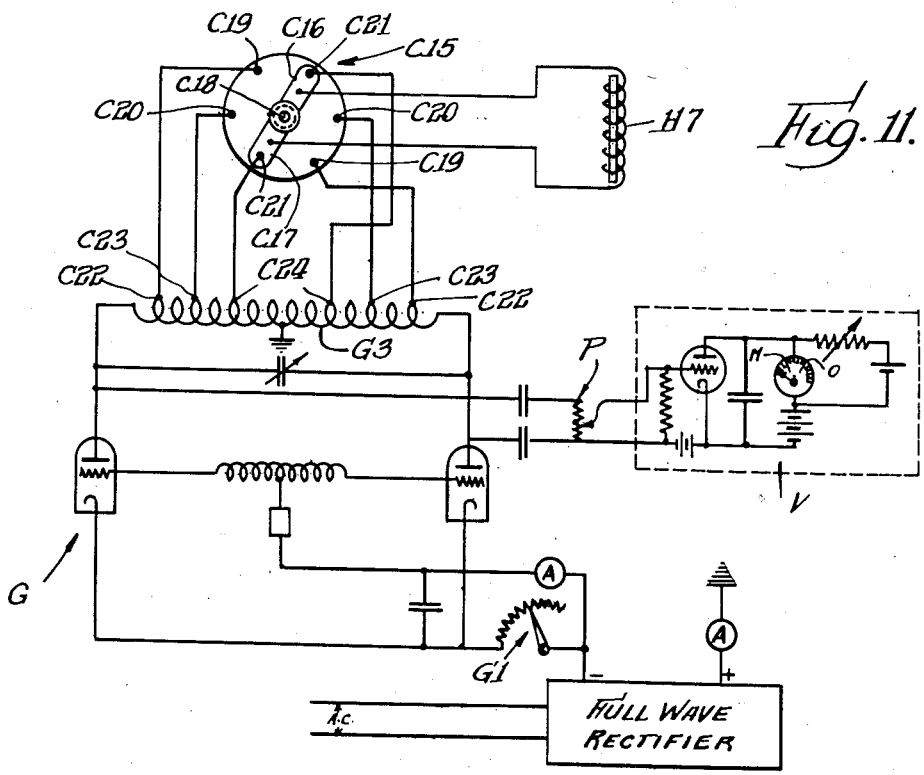
INVENTOR.
Eugene Mittelmann
By Maurice S. Cayne
atty.

Patented May 17, 1949

2,470,443

UNITED STATES PATENT OFFICE 2,470,443

MEANS FOR AND METHOD OF CONTINUOUSLY MATCHING AND CONTROLLING POWER FOR HIGH-FREQUENCY HEATING OF REACTIVE LOADS

Eugene Mittelmann, Chicago, Ill.

Application July 21, 1944, Serial No. 545,917

9 Claims. (Cl. 219—47)

This invention relates to method and apparatus for heating by means of high frequency electric current.

The object of the invention is to secure optimum transfer of energy from a high frequency generator to the material or object to be heated. It is known that such transfer requires that the impedance of the load as reflected into the generator be equal to the internal impedance of the generator or the optimum load impedance value of the oscillator, and that the load impedance reflected into the generator may be changed by adjusting a variable coupling between the generator and the load. My invention is concerned with method and means for adjusting such a variable coupling so as to obtain initial matching of the reflected load impedance to the generator impedance, and so as to maintain such matching on changes of the load impedance during heating.

The method which I have invented consists generally of applying a heated load to a generator through a variable coupling and then adjusting the coupling to make the resonant voltage of the circuit a predetermined fraction of the resonant no-load voltage at the same power level. These steps, which are best performed at a low power level, result in adjusting the coupling so as to produce initial matching of the reflected load impedance to the generator impedance. The next step consists in raising the power level or generator voltage to the desired value without changing the adjustment of the coupling. This increases the resonant voltage without changing the matching relation between the reflected load impedance and the generator impedance. In order to maintain the matched condition on changes in the load impedance, which cause the resonant voltage to depart from the value which it had after the power level was raised, the coupling is adjusted continuously until the resonant voltage is returned to that value. Any other electrical quantity which is related to the resonant voltage may be used to govern this continuous adjustment of the coupling.

My invention includes apparatus which in one form so facilitates the practice of the method that it may be carried out by an unskilled workman, and in another form includes means which carries out the method automatically.

Figs. 4 and 5 are schematic diagrams illustrating different forms of coupling which may be used in the circuit shown in Fig. 3;

Fig. 6 is a schematic diagram of the apparatus form of oscillation generator and load coupling circuit which may be used in the circuit shown in Fig. 3;

Fig. 7 is a schematic diagram of the apparatus of Fig. 1 when including an inductive heater, and illustrates a modification of the means for measuring the resonance voltage and exciting the follow-up control;

Fig. 7a is a fragmentary enlarged view in section through the variable coupler of Fig. 7;

Figs. 8, 9 and 10 illustrate various forms of coupling which may be substituted for the coupling shown in Fig. 7; and Fig. 11 is a schematic diagram of a heating apparatus including an inductive heater and a different form of coupler for effecting initial matching of the load to the generator.

Figure 1:
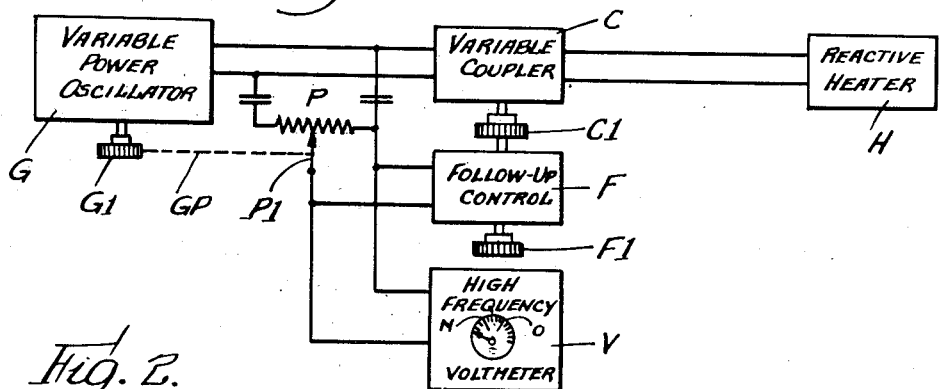
Fig. 1 is a block diagram of a heating apparatus including an electronic oscillation generator and a heater, and provided with means embodying my invention for initially matching the load impedance to the generator impedance and for maintaining the matched condition during heating.

Fig. 1 shows a typical high frequency heating circuit in which a reactive heater H is coupled to a variable power generator, such as an electronic oscillator G, through a continuously variable coupler C, i. e., a means which is adjustable by continuous motion and as it is adjusted varies the coupling ratio through a continuous, uninterrupted, series of values. The oscillator is provided with a power level or D. C. voltage control GI, while the coupler C has a control CI for adjusting the coupling. A high frequency voltmeter V is connected across the circuit in advance of the coupler C.

Figure 2:
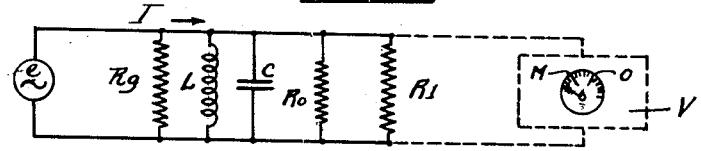
Fig. 2 is the equivalent parallel circuit of the heating apparatus indicated in Fig. 1.

Fig. 2 represents the equivalent parallel circuit of the oscillator-heater circuit shown in Fig. 1. In this equivalent circuit, $e$ and $R_g$ represent the voltage and internal, parallel resistance of a generator and the optimum load resistance value of an oscillator, which delivers constant current at a variable voltage, L represents the equivalent parallel, pure inductance of the tank and load-receiving circuit, C represents the equivalent parallel, pure inductance of the tank and load-receiving circuit, $R_0$ represents the equivalent parallel no-load loss resistance of the tank and load-receiving circuit, and $R_1$ represents the equivalent parallel loss resistance which is added by the introduction of the load.

From Fig. 2 it is evident that:

$$e_0 = I_0 . R_0 \quad (1)$$

where $e_0$ is the no-load value of the voltage $e$ and $R_0$ is the resonant impedance or loss resistance of the unloaded circuit at the no-load frequency.

It is further evident from Fig. 2 that under load conditions, the generator operating without change in the power setting:

$$e_L = I_0 . R_L \quad (2)$$

where $e_L$ is the load value of the voltage $e$ and $R_L$ represents the resonant impedance of the loaded circuit at the load frequency and is a resultant of the loss resistance $R_0$ at the load frequency and the reflected load loss resistance $R_1$ at the load frequency. The current $I_0$ flows through the resistance $R_0$ under no-load conditions and the current $I_0$ flows through the resistances $R_0$ and $R_1$ in parallel under load conditions. $R_L$ is simply the resultant resistance of the parallel combination of $R_0$ and $R_1$.

In order to attain maximum transfer of energy to the load circuit, $R_L$ must be equal to $R_g$, and the voltage $e_m$ under matched conditions will be:

$$e_m = I_0 . R_g \quad (3)$$

The ratio between the resonant voltage value $e_m$ which indicates matching, and the no-load resonant voltage value $e_0$, may be obtained from Equations 1 and 3 and is as follows:

$$\frac{e_m}{e_0} = \frac{R_g}{R_0} \quad (4)$$

$R_g$ is a constant of the generator or oscillator and may be measured by known methods when the apparatus is made. For any given resonant frequency $R_0$ is also a constant of the apparatus and may be measured when the apparatus is made.

The value of $R_0$ at the frequency $f_x$ at which it is measured is:

$$R_{0_x} = \frac{L_x}{C_x . R_s} \quad (5)$$

where $R_s$ is the equivalent series loss resistance of the unloaded circuit and is independent of frequency, $C_x$ is the capacitance of the circuit at frequency $x$ and $L_x$ is the inductance of the circuit at the frequency $x$. At any other resonant frequency $f_y$ different from that at which it was measured:

$$R_{0_y} = \frac{L_y . C_x}{L_x . C_y} . R_{0_x} \quad (6)$$

whereas $C_y$ is the capacitance of the circuit at frequency $y$ and $L_y$ is the inductance of the circuit at frequency $y$.

Therefore, if the voltage $e_0$ is measured at a no-load frequency $f_y$, then from Equations 4 and 6 it follows:

$$\frac{e_m}{e_0} = \frac{L_x . C_y}{L_y . C_x} . \frac{R_g}{R_{0_x}} \quad (7)$$

It will be clear from Equation 7 that the attainment of matched conditions is dependent on the frequency at which $R_0$ was measured and the frequency of operation of the unloaded circuit.

However, if $R_0$ was measured at the unloaded circuit frequency $f_x$, then $L_x$ equals $L_y$ and $C_y$ equals $C_x$ and Equation 7 becomes the same as Equation 4 in which the ratio of voltages to attain initially matched conditions is independent of the frequency and of the changes in reactance caused by the insertion of the load.

After the load has been initially matched, the value of $e_m$ will vary with the changes in the reactances of the circuit. Assuming that the load has been initially matched, then as the load varies and the coupling is adjusted to rematch, rematching voltage $e_{m_2}$ may be expressed in terms of the initial voltage $e_m$ as follows:

$$\frac{e_{m_2}}{e_m} = \frac{L_m . C_{m_2}}{L_{m_2} . C_m} \quad (8)$$

where $L_m$ and $C_m$ are the circuit inductance and capacitance at the initial matching frequency and $L_{m_2}$ and $C_{m_2}$ are the circuit inductance and capacitance at the rematching frequency.

If the reactive heater is so coupled to the generator or oscillator that the reactance of the loaded heater is only a small part of the total circuit reactance of like kind, then the changes in the reactance of the circuit during heating will be substantially due to the change in the coupling required to reestablish matched conditions. I have found that for a large change in the value of the equivalent loss resistance, only a relatively small percentage of change is required in the reactances of the circuit to reestablish the matched conditions and hence the voltage $e_{m_2}$ is, for all practical purposes, substantially equal to $e_m$, for $$\frac{C_{m_2}}{L_{m_2}}$$

is substantially equal to $$\frac{L_m}{C_m}$$

After the value of the fraction $$\frac{R_g}{R_0}$$

has been initially determined, for any particular heating apparatus, the adjustable coupling may be set to obtain initial matched condition and adjusted to maintain that matched condition by the following method:

With the control G1 of the oscillator set at a low power level and the heater H disconnected, or connected but empty, the resonant voltage $e_0$ is measured by the voltmeter V. The value of $e_m$ may then be obtained immediately by multiplying the measured value of $e_0$ by the predetermined and known fraction $$\frac{R_g}{R_0}$$

The load is then applied by connecting the heater H, or by placing the material in the heater if the heater is already connected, without making any change in the power level control G1, and the coupler control C1 is then adjusted until the resonant voltage indicated by the voltmeter V is at the computed value of $e_m$. The control G1 is then adjusted to raise the power level of the oscillator to the desired value. This adjustment of the control G1 causes an increase in the voltage measured by the voltmeter V. This increased value of the resonant voltage is then used as a guide in adjusting the control C1 during the heating operation. The coupler C1 is adjusted whenever the resonant voltage departs from that value and is continued until the resonant voltage is brought back to that value.

The simplest means which may be used for this purpose consists, in accordance with my invention, in the provision of two guiding marks, one of which serves to indicate the value of the voltage required for initial matching of the load to the oscillator and is located on the dial of the voltmeter V, and the other of which serves principally as a recalibrating or normalizing mark which may be either on the voltmeter dial or on the position-indicating dial of the power level G1. When such marks are used, the necessity of multiplying the measured no-load voltage by the predetermined fraction is avoided. An arbitrary value for the no-load voltage $e_0$ is selected when the equipment is made and this arbitrarily selected value is multiplied at the same time by the fraction $$\frac{R_g}{R_0}$$

to obtain the corresponding value of $e_m$.

The arbitrarily selected value of $e_0$ may be indicated by a mark O, and the value ($e_m$) obtained by multiplying the arbitrary value $e_0$ by the fraction $$\frac{R_g}{R_0}$$

may be indicated by a mark M on the voltmeter dial.

With two marks on the voltmeter, the heater load circuit is initially matched to the oscillator by first adjusting the power level control of the oscillator to bring the needle of the voltmeter to the mark O when the heater is disconnected, or connected but empty; the heater is then connected, or the material is placed in the heater; and then the control C1 is adjusted to vary the coupling to bring the needle of the voltmeter to the mark M.

If the apparatus is provided with a plate voltage stabilizer or regulator, the mark O can, if preferred, be placed on the position indicator dial of the power control G1, thus indicating the setting of this control required to establish the arbitrarily selected value $e_0$ at the stabilized value of plate voltage.

In order to facilitate the maintenance of the matched condition during the heating operation, the voltmeter V may be connected to the power circuit through a potentiometer or sensitivity control P having a controller P1. This arrangement provides a control voltage across the voltmeter V which varies in proportion to the resonant voltage of the whole circuit, and at the same time permits adjustment by control P1 of the ratio between the voltage indicated by the voltmeter and the resonant voltage.

When the potentiometer is manually adjustable, it may be used as follows: To initially match the load to the oscillator, the control P1 is preferably set in position of maximum sensitivity so as to make the voltage applied to the voltmeter equal to the resonant voltage. The power level control having been set to bring the needle of the voltmeter to the mark O and the load having been applied, the coupler control C1 is adjusted to bring the needle of the voltmeter to the mark M. The power level is then increased by adjustment of the control G1 of the oscillator. This causes an increase in the voltage impressed on the voltmeter so that the needle is moved from mark M toward or beyond mark O. The control P1 of the potentiometer is then adjusted to bring the needle of the voltmeter back to the mark M. This, of course, has the effect of varying the voltage applied to the voltmeter in the inverse ratio of the original resonant voltage to the new resonant voltage. The voltage as indicated by the voltmeter may then be used as a guide to maintain the matched conditions on changes of load impedance during the heating. Therefore, as the needle of the voltmeter, during the heating operation, departs from the mark M, the coupler control C1 is adjusted until the needle returns to that mark.

A further feature of the invention consists in automatic means for continuously adjusting the coupling C1 to maintain the matched conditions during the heating operation. For this purpose, a follow-up control F is mechanically connected to the control C1 of the variable coupler and electrically connected to the oscillator-heater circuit in advance of the variable coupling to respond to the resonant voltage or to some other electrical quantity of the circuit that is related to the resonant voltage. The follow-up control operates the variable coupler control C1 on any departure of the electrical quantity from a preset value. It may have a manual control F1 for presetting this value. When the follow-up control is connected across the output of the sensitivity control or potentiometer P, as shown in Fig. 1, the control F1 is set to cause the follow-up control to respond to the voltage value indicated by the mark M on the voltmeter V. The follow-up control, therefore, automatically adjusts the variable coupling whenever the resonant voltage departs from the value indicated by the mark M, and stops the adjustment of the coupler as soon as the voltage has returned to the value indicated by that mark. It thus automatically maintains the matched condition during the heating operation.

It should be noted that in the arrangement illustrated in Fig. 1, the potentiometer P simultaneously adjusts or determines the value of the voltage impressed on the voltmeter and the value of the voltage impressed on the follow-up control. Therefore, if the control F1 of the follow-up is adjusted to respond to the voltage value $e_m$ indicated by the mark M, it need not be changed on adjustment of the power level.

A further feature of the invention consists in the provision of automatic means for adjusting the value of the voltage impressed on the voltmeter or on the follow-up control in accordance with the power level setting of the oscillator. It is exemplified in Fig. 1 by a mechanical connection indicated by the dotted line GP between the power level control G1 and the potentiometer control P1. The potentiometer P may be calibrated so that adjustment of the power level control G1 automatically positions the potentiometer control P1 at the position required to impress the voltage $e_m$ across the voltmeter and across the follow-up control at each power level setting of the control G1.

When the power level control G1 and the potentiometer control P1 are thus interconnected, the apparatus is entirely automatic. It then becomes necessary merely to connect the heater to the circuit, or to place the material in the heater if it is already connected, and then to adjust the power control to any desired power level. The follow-up control then automatically adjusts the coupling to establish and maintain the matched condition. The voltmeter, if used, then automatically indicates the establishment of the matched condition as the coupler control C1 is adjusted and serves as an indicator of the maintenance of the matched condition.

It is, of course, evident that with the fully automatic arrangement last described, the voltmeter V is used only for checking the operation of the follow-up control and may, if desired, be omitted.

Various practical circuit arrangements providing one or more features of the invention, generally described with reference to Fig. 1, are illustrated in Figs. 3 to 11. In each of these circuits, when used to maintain the matched condition, the heater is so coupled to the tank circuit of the oscillator that the heater reactance is a relatively small part only of the total reactance of like kind of the untuned branch to which the heater is thus coupled.

Figure 3:
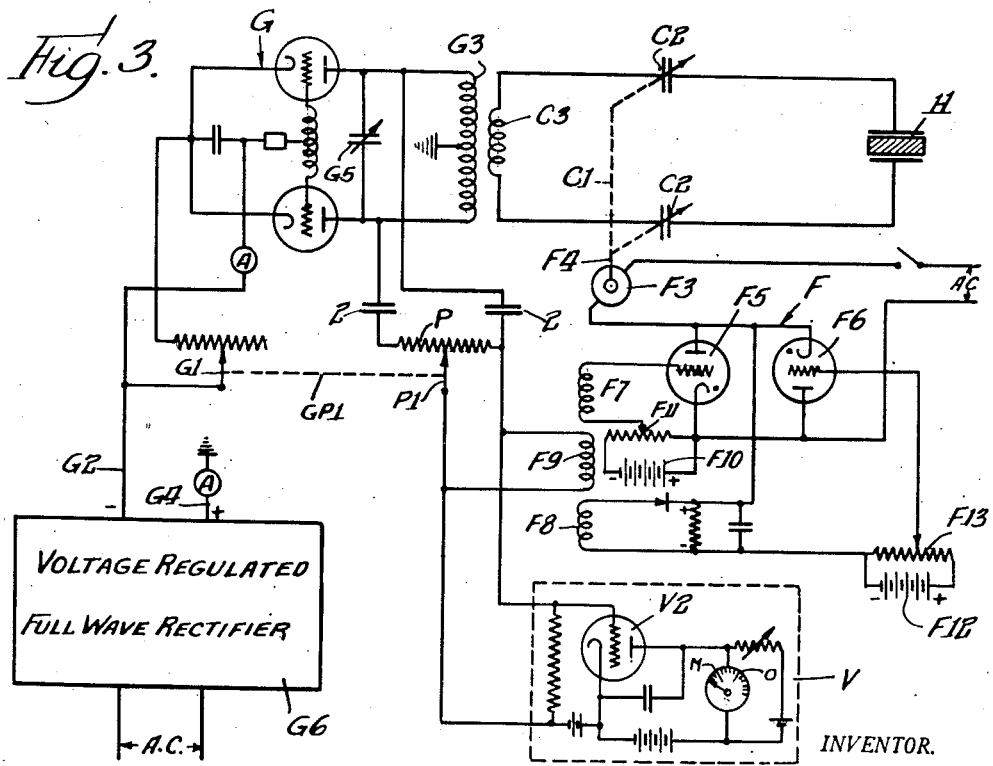
Fig. 3 is a schematic diagram of the apparatus of Fig. 1, and illustrating a specific circuit for energizing a capacity heater.

As shown in Fig. 3, the reactive heater H is an electrostatic heater adapted to receive the dielectric material or object to be heated, and the variable coupler comprises the variable air condensers C2 and a coil C3 in series with the heater and the condensers C2. The adjusting shafts of the coupling condensers are interconnected for simultaneous adjustment by the coupler control C1, indicated by dotted lines in Fig. 3. The oscillator G comprises, as shown in Fig. 3, a tuned-plate, tuned-grid, push-pull oscillator having a power level control G1 in the form of a rheostat connected between the negative power supply lead G2 and the cathodes of the oscillator tubes. The coil C3 is inductively coupled to the tank coil G3 of the oscillator, the mid-tap of the tank coil being connected to the positive power supply lead G4 through the ground connections shown. The tank coil G3 is tuned by the tank condenser G5.

The oscillator power supply leads G2 and G4 are connected to the rectifier power supply unit G6, which includes a usual form of plate voltage stabilizer or regulator.

The potentiometer P is connected across the tank circuit by means of the D. C. blocking condensers 2. The high frequency voltmeter V comprises the usual amplifier V2 resistance coupled, as shown in Fig. 3, to one end of potentiometer P and the potentiometer control P1. On the dial of the voltmeter are the marks O and M previously described with reference to Fig. 1.

The follow-up control F, as shown in Fig. 3, includes a permanent magnet D. C. motor F3 mechanically connected as indicated by the dotted line F4 to the coupler control C1 and electrically connected to the plate circuits of Thyratron tubes F5 and F6 connected in back-to-back relation. The grid circuit of the tube F5 includes the secondary winding F7 of a transformer, having its other secondary winding F8 connected in the grid circuit of the tube F6, and its primary winding F9 connected to the potentiometer P in parallel to the voltmeter V. The grid circuit of the tube F5 also includes a negative grid biasing source F10 adjustably connected to the grid through potentiometer F11. The energy supplied by the transformer F8 is rectified and impressed as a negative voltage on the grid of the tube F6. The grid circuit of the tube F6 also includes a positive biasing source F12 connected to the grid through potentiometer F13.

The potentiometers F11 and F13 are adjusted to cause the tube F5 to conduct when the voltage impressed thereon from the potentiometer P is above the matching value, and the tube F6 to conduct when the voltage impressed thereon from the potentiometer P is below the matching value. When the tube F5 fires, current flows through the armature of the motor F3 in one direction and when the tube F6 fires, the current flows through the armature of the motor in the opposite direction. Thus, the motor F3 acts to adjust the coupling control in one direction or the other as necessary, to return the resonant voltage to the matching value when it has departed therefrom.

It should be specifically noted that the potentiometers F11 and F13 constitute the adjuster or presetter F1 of the follow-up control, and are adjusted to cause the tubes to respond on departure of the resonant voltage from the value indicated by the mark M on the voltmeter dial.

If the power supply rectifier G6 of the oscillator includes a voltage stabilizer, the power control G1 may be mechanically connected to the control P1 of the potentiometer as indicated in Fig. 3 by the dotted line GP1. The potentiometer P is calibrated by appropriate winding of different turn-sections, or by providing different resistance unit values between contacts engaged by the control P1, so that the voltage impressed on the follow-up control and the voltmeter is always related to the power level setting of the generator. Since the load when initially matched remains matched notwithstanding changes in the power level, the resistor sections or units of the potentiometer P are related to the no-load resonant voltages produced at the different power level settings of generator in the matching ratio of $$\frac{R_g}{R_0}$$

As shown in Fig. 4, the electrostatic heater H2 comprises a pair of electrodes H3 and H4, generally co-planar but spaced apart a slight distance at their adjacent edges from a cooperating common electrode H5 grounded as at 4. The heater receives a plurality of objects between the plates H3, H4 and H5. The coupling condensers C2 in this form of the invention are connected directly to intermediate taps on the tank coil G3 of the oscillator G. The oscillator is of the same structure as illustrated in Fig. 3.

As shown in Fig. 5, the coupling condensers C2 are connected, in series with the electrostatic heater H, to the end terminals of coils C4 and C5 which may be formed integrally with the tank coil G3 of the oscillator. This arrangement permits the matching of an electrostatic heater whose impedance is large compared with the internal impedance of the oscillator or of the optimum load impedance value for the oscillator.

As shown in Fig. 6, the electrostatic heater H is connected through a variable coupling inductance C6 and a variable coupling condenser C7 to the tank coil G7 of a single-ended oscillator G8. Such a single-ended oscillator may be of any well known structure. In the form shown in Fig. 6, it differs primarily from the push-pull oscillator of Fig. 3 in the elimination of one of the oscillator tubes and the balanced or push-pull connections to the tank circuit condenser and coil, the tank coil being now connected at one end to the positive side of the plate supply source G6 through the grounding connections shown. The adjustable series coupling inductance C6 prevents series resonance between the tapped portion of the tank coil G7 and the electrostatic heater and the coupling condenser. Such series resonance would, if permitted, result in short circuiting of the tapped portion of the coil and cause very high currents to flow through the remaining portion of the tank coil and thus overload the oscillator tubes.

Either the variable inductance C6 or the variable condenser C7 may be utilized to attain initial matching of the load to the generator and to maintain that matched condition during the heating operation. This may be accomplished by connecting the adjusting element of the selected coupler to the follow-up control, as shown in Fig. 3. If the variable inductance is used to establish or maintain the matched condition, it should preferably be formed of two inductor elements, one of which is of a value such as to prevent series resonance, while the other is variable to effect or maintain the matched condition. The coupling condenser C7, if not used to effect or maintain matched condition, may be eliminated except in those cases where the dielectric constant of the material varies substantially during heating, as for example in the drying of dielectric materials.

As shown in Fig. 7, the reactive heater comprises an induction heater H6 adapted to receive the metal object or material to be heated, and directly connected to intermediate taps on tank coil G9 of the push-pull, feed-back oscillator G10.

The variable coupler comprises one or more iron dust or powdered iron slugs or core members C8 and C9 adjustable axially of the tank coil, past the intermediate taps to which the heater is connected so as to vary the relation of the inductance of the coil portion between the taps to the inductance of the coil portions outside the taps and thereby vary the coupling ratio.

A simple means for adjusting these core members comprises a screw-threaded rod C10 extending axially through the tank coil and having right-hand threads and left-hand threads interengaging with the internally threaded core pieces C8 and C9, which, of course, are threaded internally in opposite directions to correspond to the oppositely threaded portions of the rod. Each of the slugs is provided with a radially projecting lug C11 as illustrated with respect to core piece C8 in Fig. 7a. The lug C11 is received in a longitudinal slot in a sleeve C12 of insulating material fixedly mounted in the coil in any convenient manner, the longitudinal slot being indicated in Fig. 7a by the absence of cross hatching of the upper edge of the sleeve section. The screw rod C10 is so positioned in the coil that the right-hand thread extends from the center toward one end and the left-hand thread extends from the center toward the other end, so that when the rod is rotated in one direction, the core pieces will be moved toward each other and when the rod is rotated in the opposite direction, they will be moved away from each other.

The power level control G11 of the oscillator G2 is connected between the common cathode lead and the negative supply lead G12 of the full-wave power supply rectifier G13 having its positive supply lead G14 connected to the midtap of the tank coil G9 through the grounding connections as shown.

In this circuit, the high-frequency voltmeter comprises a balanced bridge circuit by which a voltage proportional to the resonant voltage across the tank circuit, or to the plate current of the oscillator, is balanced against the voltage determined by the setting of the power level control G11. The voltage determined by the positioning of a divider V9 is made such that at each setting of the power control it is proportional to the no-load resonant voltage for that setting multiplied by the predetermined matching fraction $$\frac{R_g}{R_0}$$

The bridge circuit will, therefore, always be in balance when the resonant voltage is of the value $e_m$, as indicated by the mark M in Fig. 1. The voltage across the balance arms of the bridge may hence be used to indicate the matching condition, and also used as the control voltage for the follow-up control.

As shown in Fig. 7, the high frequency balanced bridge voltmeter V3 comprises a pick-up or secondary coil V4 inductively coupled to the tank coil G9. The voltage picked up by this coil V4 is rectified by rectifiers V5 and applied across the voltage divider V6. The D. C. voltage is related to the resonant voltage, or to some other electrical quantity of the oscillator plate circuit which in turn is related to the resonant voltage. Vacuum tube V7 has its grid and cathode connected between the wiper arm and the positive voltage end of the voltage divider V6. Vacuum tube V8 has its grid and cathode connected between the negative end of the voltage divider V9 and the wiper arm of that divider. The voltage divider V9 is connected in series with the fixed voltage dropping resistor V20 across the power supply leads G14 and G12. The wiper arm of the voltage divider V9 is mechanically interconnected to the wiper arm of the power level control G11 as indicated by the dotted line GV1. The plates of the tubes V7 and V8 are interconnected through equal-valued resistors V11 and V12 which form the balance arms of the bridge circuit and are connected at their adjacent ends to the power supply through the ground connections as shown in Fig. 7. The positive supply lead G14 provides the necessary plate voltage for the tubes V7 and V8. The balance-indicating or zero-center voltmeter or galvanometer V13 is connected between the outer ends of the bridge resistors.

The voltage across the divider V6 is, of course, always related to the tank circuit voltage and whenever the high frequency voltmeter bridge is balanced, the voltage taken off from the divider V6 and applied to the grid of the tube V7 will be equal to the voltage taken off from the divider V9 and applied to the grid of the tube V8. The voltage divider V6 may be calibrated or adjusted once and for all in the making of the apparatus, under no-load conditions, at any desirable, preferably low-level, setting of the power level control G11. It is calibrated in such manner that the bridge is balanced as indicated by the galvanometer V13, and the wiper arm of the voltage divider V6 locked in that calibrated position. If desired, the wiper arm may be left free for recalibration at any time when in use.

The apparatus illustrated in Fig. 7 may be manually adjusted to initially match the load to the oscillator and to maintain the matched condition in substantially the same manner as described with reference to Fig. 1. In such case, the power level control G11 is initially set at some low level under no-load conditions. If the meter V13 does not indicate a balanced condition of the bridge, the wiper of the divider V9 may be adjusted to bring the needle of the voltmeter to the balance point.

Such adjustment will, of course, not ordinarily be required when the power supply rectifier includes a voltage stabilizer or regulator, since its only purpose is to effect zeroizing of the bridge voltage.

The load is then applied to the tank circuit, either by connecting the heater to it, or by placing the material in the heater if it is already connected. On application of the load, the needle of the meter V13 will be deflected in a direction indicating a drop in the voltage applied to the grid of the tube V7. The coupling between the heater circuit and the oscillator is then adjusted by manual rotation of the coupler control C1 on the end of the rod C10 until the needle of the meter V13 is brought back to its zeroized or balanced position. The load is now initially matched to the oscillator. On variation of impedance of the heater during the heating operation, the meter V13 will indicate the unbalanced condition of the bridge and the rod C1 is then adjusted to rebalance the bridge and thereby re-establish the matched condition.

If it is desired to carry out the method automatically, the follow-up control F14 is connected directly across the balance points V15 and V16 of the voltmeter bridge circuit and comprises a pair of gaseous discharge tubes or Thyratrons F15 and F16 having their plates connected to the opposite ends of the center-tapped secondary of the transformer F17 connected across the alternating current supply lines. The cathode of the tube F15 is connected by wire F18 to one end of the forward field winding F19 of the two-winding, series field, D. C. reversing motor F20 having its drive shaft geared to the adjusting screw rod C10, as indicated in Fig. 7. The cathode of the tube F16 is connected by wire F21 to one end of the reverse field winding F22 of the motor. The armature of the motor is connected in common to the other ends of the field windings, and by wire F23 to the center tap of the secondary of the transformer F17.

The grid of the tube F15 is connected to a negative biasing source F24 composed of a voltage divider and a voltage source, the wiper arm of the voltage divider being connected by wire F25 to the outer end of the bridge resistor V12 of the voltmeter bridge circuit V3. The grid of the tube F16 is connected to a negative biasing source F26 composed of a voltage divider and voltage source, the wiper arm of the divider being connected by wire F27 to the outer end of the bridge resistor V11. The cathode of the tube F15 is connected directly to the wire F27 and the cathode of tube F16 is connected directly to the wire F25.

The negative bias voltages on the tubes F16 and F17 are sufficient to prevent the tubes from firing when no voltage difference exists between the balance points of the bridge. Whenever the bridge becomes unbalanced, a voltage difference will exist between the balance points V15 and V16. The point V15 will be at a positive potential in respect to the point V16 whenever the resonant or tank circuit voltage is above the value required, and will be at a negative potential with respect to the point V16 whenever the resonant or tank circuit voltage is below the required value. Whenever the point V15 becomes positive with respect to the point V16, tube F16 operates because the negative grid bias of the source F26 is reduced by the positive voltage difference between the wire F27 and the wire F25. Whenever the point V15 becomes negative, the gaseous tube F15 fires because the negative grid bias of the source F24 is overcome by the positive voltage difference between the wire F25 and the wire F27. Whenever the tube F16 fires, the motor F20 is energized for rotation in a direction to cause the variable coupling to effect a reduction in the resonant or tank circuit voltage. Whenever the tube F15 fires, the motor is energized to rotate in the opposite direction to cause the variable coupling to effect an increase in the resonant or tank circuit voltage.

As shown in Fig. 8, the inductive heater H7 is coupled to the tank coil G15 of the oscillator G16 through a variable inductive coupler C12 which may comprise a variometer of the usual construction having interconnected relatively movable coils, the adjustment of which varies the mutual inductance between the coils. One end of the heater H7 is directly connected to an intermediate tap on the tank coil G15, while the variable coupler C12 is directly connected to another intermediate tap on the tank coil. The oscillator G16 is of the same construction as the oscillator G of Fig. 3, or the oscillator G10 of Fig. 7. It will be evident, of course, that the variable coupler C12 may be manually or automatically adjusted as illustrated in Figs. 1, 3 and 7.

In the arrangement shown in Fig. 9, the inductive heater H7 is coupled to the oscillator through the variable coupler condensers C2 which are directly connected to intermediate taps on the tank coil G15 of the oscillator G16.

As shown in Fig. 10, the inductive heater H7 is connected through the variable coupling condensers C2 to the outer ends of coils C13 and C14 inductively related, and connected, to the tank coil G15 of the oscillator G16. This coupling arrangement permits an inductive heater load which has an impedance larger than the internal impedance of the generator or the optimum load impedance value of the oscillator to be matched to the generator or oscillator.

In the circuit shown in Fig. 11, the variable coupler for coupling the inductive heater H7 to the oscillator G comprises a selector switch C15 by means of which any one of a number of taps on the tank coil G3 are selected to initially match the impedance of the inductive heater load to the internal impedance of the oscillator. The coupler C15 comprises a pair of wiper arms C16 and C17 mounted on, but insulated from, a common adjusting shaft C18 so that the arms rotate in unison and simultaneously connect pairs of contacts C19, C20 and C21 to the heater. These pairs of contacts C19, C20 and C21 are directly connected to corresponding pairs of intermediate tank coil taps C22, C23 and C24 respectively. The high frequency voltmeter V is connected across the tank circuit in the same manner as described with reference to Fig. 3. It is to be understood, however, that this high frequency voltmeter may be of the balanced bridge structure shown in Fig. 7.

While in the circuit of Fig. 11, an inductive heater is illustrated, it is to be understood that the heater may be replaced in many instances by an electrostatic heater similarly connected directly, or through series coupling condensers, to the wiper arms of the selector switch. It will be furthermore clear that the selector switch may embody any desirable number of pairs of selectable contacts connected to any desirable number of pairs of intermediate taps on the tank coil, so that any of a desired number of heaters or heater circuits of different impedances may be initially matched to the oscillator.

In initially matching the heater circuit to the oscillator of Fig. 11, the circuit is adjusted as follows:

The heater being disconnected, or connected but empty, the power level control G1 is initially adjusted to a low level value sufficient to bring the needle of the voltmeter to the mark O when the potentiometer P is set in maximum voltage position. The heater is then connected, or the material placed in the heater if already connected, and the selector switch then rotated by adjustment of the shaft C18 to select that pair of contacts which bring the needle of the voltmeter exactly, or most nearly, to the mark M. The power level control is then adjusted to set the power level at the desired value and a new reading of the voltmeter V noted as a guide for subsequent maintenance of the matched condition, or more desirably, the needle is brought back to the mark M by adjustment of the potentiometer P. In cases where the extent of variation of the load impedance during heating is such that the incremental change in the coupling ratio which may be effected by movement of the wiper arms of the variable coupler from one set of contacts to the next adjacent set of contacts is greater than that required to effect rematching at the desired instant during the heating operation, the coupler may be adjusted initially to match the oscillator impedance to an average or geometric mean impedance value of the heater load, as determined by previous measurements of the time-impedance or temperature-impedance curve of the material to be heated. The selector switch may then be left in its initially adjusted position during the entire heating operation. The power delivered to the heater circuit will then increase to the optimum value during a part of the heating operation and decrease to zero value during another part of the heating operation, but the average power value will be higher than in the case where the load is matched to the generator initially and the coupling left in that position during the entire heating operation.

While certain specific structural details have been disclosed and described herein for the purpose of illustrating certain embodiments of my invention, it will be apparent that other modifications and changes may be made without departing from the spirit and scope of the appended claims.

I claim:

1. In high-frequency heating apparatus, the combination of an electronic oscillator having a tank circuit, a reactive heater, a continuously variable coupler connecting the heater into an untuned branch of the tank circuit, a circuit for tapping off from the oscillator a voltage proportional to the resonant voltage across the tank circuit, and means connected to the coupler and controlled by the tapping off circuit to vary the coupling ratio in one direction when the tapped off voltage exceeds a predetermined value and in the other direction when the tapped off voltage is below said pretermined value, without stopping the oscillator.

2. In high-frequency heating apparatus, the combination of an electronic oscillator having a tank circuit, a reactive heater in an untuned branch of the tank circuit, a continuously variable reactance means in series with the heater, a circuit for tapping off from the oscillator a voltage proportional to the resonant voltage across the tank circuit, and means connected to said reactance device and controlled by the tapping off circuit to vary the reactance of said reactance means in one direction when the tapped off voltage exceeds a predetermined value and in the other direction when said voltage is below said predetermined value, without stopping the operation of the oscillator.

3. In high frequency heating apparatus comprising a high frequency oscillator, a circuit including a reactance heater and a variable reactance means controlling the coupling of the heater to the oscillator, means for adjusting said variable reactance means, said adjusting means comprising a reversible motor mechanically connected to said reactance means, a space discharge tube connected to said motor for supplying current thereto for operation in one direction, a second space discharge tube connected to the motor for supplying current thereto for operation in the reverse direction, means for tapping off a control voltage from the oscillator and control circuits for said tubes including means connected to said voltage tapping off means for rendering one of said tubes operative on an increase in said voltage and for rendering the other operative upon a decrease in said voltage.

4. In high-frequency heating apparatus, the combination of an electronic oscillator having a tank circuit, a reactive heater circuit coupled to the tank circuit, means for continuously varying the impedance in one of said circuits to vary the coupling ratio, a circuit for tapping off from the oscillator a control voltage proportional to the value of the voltage across the tank circuit, means responsive to the tapped off voltage supplied by the tapping off circuit for actuating said impedance-varying means when the control voltage varies from a predetermined value, and means for changing the power level of the oscillator without changing the control voltage comprising a manual power level adjuster, a voltage adjuster in the tapping off circuit and an interconnection between them.

5. In high-frequency apparatus, the combination of an electronic oscillator having a tank circuit, a reactive heater, a heater circuit coupling the heater in an untuned branch of the tank circuit, a continuously variable reactance means in one of said circuits to vary the coupling ratio, a circuit for tapping off from the oscillator a voltage proportional to the resonant voltage across the tank circuit, and means connected to said reactance means and controlled by the tapping off circuit to vary the reactance of said reactance means in one direction when the tapped off voltage exceeds a predetermined value and in the other direction when said voltage is below said predetermined value, without stopping the operation of the oscillator.

6. The method of operating an electronic heating apparatus comprising an oscillator, means for varying the direct current plate to cathode voltage of the oscillator, a reactive heater coupled to the oscillator, an adjustable coupling control device for varying the impedance ratio of coupling of the heater to the tank circuit of the oscillator, and means for adjusting the coupling control to vary the coupling ratio, which method consists of the following steps, (1) adjusting the direct current plate to cathode voltage of the oscillator to make the resonant voltage across the tank circuit under no-load conditions equal to an arbitrary value $e_0$, (2) rendering the reactive heater effective to heat material in the electric field thereof, (3) adjusting the coupling control without varying the direct current plate to cathode voltage of the oscillator to make the resonant voltage across the tank circuit under load conditions equal to the arbitrary value $e_0$ divided by the fraction $$\frac{R_0}{R_g}$$

$R_0$ being the equivalent loss resistance of the apparatus external to the oscillator and parallel to the tank circuit under no-load conditions and $R_g$ being the optimum load resistance value of the oscillator.

7. In high frequency heating apparatus comprising an oscillator having a tank circuit, a load circuit including a reactive heater coupled to the tank circuit and a variable impedance means in one of said circuits for varying the impedance ratio of coupling between the heater circuit and the tank circuit, means for tapping off from the oscillator a control voltage proportional to the voltage across the tank circuit, electrically driven adjusting means electrically connected to said voltage tapping off means and mechanically connected to said variable impedance means to adjust the coupling ratio in response to the tapped off voltage, said tapping off means and said adjusting means being calibrated to adjust the coupling ratio to the value required to maintain the load impedance across the tank circuit substantially constant.

8. In high frequency heating apparatus comprising an oscillator having a tank circuit, a load circuit including a reactive heater coupled to the tank circuit and a variable impedance means in one of said circuits for varying the impedance ratio of coupling between the circuits, means for tapping off from the oscillator a control voltage which varies with the direct current plate to cathode voltage and the voltage across the tank circuit, electrically driven adjusting means electrically connected to said voltage tapping off means and mechanically connected to said variable impedance means to adjust the coupling ratio in response to the tapped off voltage, whereby to establish and maintain a matched relation between the load circuit and the oscillator.

9. In high frequency electronic heating apparatus comprising an oscillator having a tank circuit, a reactive heater circuit coupled to the tank circuit, means for tapping off from the oscillator a control voltage proportional to the value of the equivalent loss resistance across the tank circuit, means for continuously varying the impedance of one of said circuits, means responsive to said tapped off voltage for actuating said impedance varying means to effect a compensating change in the impedance of said one circuit when said voltage varies from a preset value whereby to maintain said loss resistance substantially constant during the heating operation.

EUGENE MITTELMANN.

REFERENCES CITED

The following references are of record in the file of this patent:

UNITED STATES PATENTS

| Number | Name | Date |
|---|---|---|
| Re. 22,258 | Mittelmann | Jan. 26, 1943 |
| 1,994,324 | Suits | Mar. 12, 1935 |
| 1,998,322 | Kaar | Apr. 16, 1935 |
| 2,074,145 | Emmerling | Mar. 16, 1937 |
| 2,147,689 | Chaffee | Feb. 21, 1939 |
| 2,216,598 | Minneci | Oct. 1, 1940 |
| 2,293,851 | Rogers | Aug. 25, 1942 |
| 2,304,958 | Rouy | Dec. 15, 1942 |
| 2,324,525 | Mittelmann | July 20, 1943 |
| 2,358,454 | Goldstine | Sept. 19, 1944 |
| 2,396,004 | Gilbert | Mar. 5, 1946 |
| 2,415,799 | Reifel et al. | Feb. 11, 1947 |